Patented Dec. 1, 1942

2,303,528

UNITED STATES PATENT OFFICE 2,303,528

PRODUCTION OF ARTIFICIAL MATERIALS

Henry Dreyfus, London, England, assignor to Celanese Corporation of America, a corporation of Delaware No Drawing. Application October 5, 1940, Serial No. 359,911. In Great Britain October 23, 1939

3 Claims. (Cl. 18—54)

This invention relates to the production of artificial materials and more particularly to the production of shaped products having a basis of a cellulose derivative.

I have found that filaments, threads, foils, films and like shaped articles having a basis of a cellulose derivative may be formed by shaping in the fused condition a cellulose derivative which is substantially stable in that condition over moderate periods of time even when exposed to air or other atmosphere containing free oxygen, and thereafter setting the shaped materials.

Particularly suitable cellulose derivatives for use according to the present invention are cellulose esters containing a substantial proportion of the radicle of propionic or butyric acid or of a higher homologue of these acids, especially an acid containing up to 6 carbon atoms in the molecule. Preferably such esters contain more than one, and advantageously two or more, of such radicle for each $C_6H_{10}O_5$ group of the cellulose nucleus. Among such derivatives are, for example, substantially simple cellulose esters, e. g. cellulose butyrate containing 2 to 2.3 or 2.5 butyryl radicles per $C_6H_{10}O_5$ group, which may contain a trace of another acid radicle, especially the acetyl radicle, and mixed cellulose esters, e. g. cellulose aceto-propionate, aceto-butyrate and propio-butyrate. Where the radicle of an acid containing 3 to 6 carbon atoms in the molecule is present in the cellulose ester together with the acetyl radicle, the former radicle may advantageously be present in a greater proportion than the latter; for example esters containing 1.5 to 2, 2.3 or 2.5 propionyl, butyryl or like radicles and up to 0.5 or 0.7 acetyl radicles may be employed. Esters of this type can, in general, be employed according to the invention at relatively low temperatures. However, especially when it is not essential for the ester to possess a relatively low melting point, e. g., when the ester has a very good stability, an aceto-butyrate or other mixed acetate may be employed in which the acetyl radicle preponderates. Indeed, cellulose acetate itself may be employed.

The cellulose esters, especially lower melting esters, may advantageously, contain free nuclear hydroxyl radicles, but preferably the content of such hydroxyl radicles does not exceed 1 for each $C_6H_{10}O_5$ group.

Esters employed according to the invention are preferably such as have a very good stability, i. e. they are preferably such as have been subjected to an effective stabilising treatment after being prepared, for example, in the presence of a strong di- or poly-basic inorganic acid, or have been prepared under conditions which substantially avoid the introduction of substances which render them unstable, e. g. in the absence of di- or poly-basic inorganic acids or their derivatives.

With a view to modifying the physical characteristics of the cellulose derivative and the materials produced, particularly to increasing the flexibility of the products, a small proportion of the stearyl or other higher fatty acid radicle may advantageously be introduced into the cellulose derivative. Thus, low-melting cellulose aceto-propionate may advantageously contain about 2–5% or more of the stearyl radicle, calculated as stearic acid. Cellulose aceto-stearates or the like may also be employed. Where the effect of such a higher fatty acid radicle is only of interest in the products the radicle may be introduced after the products have been formed. Thus, filaments produced according to the invention from, for example, cellulose aceto-propionate or aceto-butyrate may be esterified with the desired amount of the anhydride or chloride of the appropriate higher fatty acid. Another method by which the flexibility of the products may be modified, and which may also serve to reduce the temperature of fusion, consists in incorporating with the cellulose derivative which constitutes the basis of the materials one or more other cellulose derivatives, especially such as have a relatively low melting point. For example, a small proportion, e. g. up to 3–5%, of cellulose stearate or other higher fatty acid ester of cellulose, based on the weight of the cellulose derivative which constitutes the basis of the materials, may be incorporated therewith. Plasticisers for the cellulose derivatives may also be incorporated in the materials, either before or after shaping, so as to modify the characteristics of the products. For example, proportions of 5 or 10 up to 35 or 40% or even more of plasticisers, based on the weight of the cellulose derivatives, may be employed.

The present invention is particularly applicable to the production of filamentary materials. Such may be produced by extruding a fused cellulose derivative of the type defined above through orifices and continuously collecting the extruded materials on rotating drums or the like, preferably at a rate in excess of that at which they emerge from the orifices so that draw-down is applied while they are still in a more or less fluid condition. The cellulose derivative may be fused, for example, by electrical or indirect steam heating. Extrusion may be effected by applying either mechanical or fluid pressure immediately to the fused derivative. Preferably, when an inert fluid is employed for this purpose, it is itself maintained at a temperature at least as high as that of the cellulose derivative. Such a fluid may be, for example, air, nitrogen, carbon dioxide, water, steam, alcohol, ethyl ether, or the vapours of either of the last two. Owing to the solubility of many higher fatty acid esters of cellulose in aromatic hydrocarbons, such hydrocarbons are usually unsuitable unless greatly diluted with an inert liquid. The temperature of the fused material is advantageously maintained up to the instant at which it leaves the orifices and for this purpose it is preferred to make provision for heating the orifices. Particularly suitable apparatus for the purpose is described in my U. S. application S. No. 333,952, filed May 8, 1940.

If extrusion is to be effected under the pressure of an inert liquid and the cellulose derivative is to be heated to a temperature above the normal boiling point of that liquid this temperature will determine the minimum pressure within the vessel and this pressure may be sufficient to effect extrusion. However, additional pressure may be applied through the liquid to assist in extruding the fused materials. Whatever method is employed for applying pressure to the fused materials, the total pressure thereon may range from 5 atmospheres or less up to 40 or 50 atmospheres or even more. For example, pressures of 12 to 15 or 20 atmospheres may be employed.

The minimum temperature of extrusion is naturally determined by the nature of the cellulose derivative materials to be extruded and it is generally preferred to maintain the temperature within 5° or 10°–20° C. above this minimum. For example, it is preferred to extrude a fused cellulose acetopropionate of melting point about 190° C. at a temperature of 193–197° C. However, temperatures of 25° C. or even more above the minimum may be employed, if desired, provided that the derivative remains stable at such higher temperatures. It is preferable to carry out the extrusion operation at a temperature not substantially exceeding 260° C. and it is consequently preferable to employ cellulose derivatives which melt at a temperature below 250° C.

Advantageously the extruded materials are subjected to a rapid and, preferably, considerable temperature drop, e. g., of the order of 100–200° C. or more, shortly after emerging from the orifices. Thus, the fused cellulose derivative may be extruded into a gaseous or vaporous medium and the extruded materials be led after a short travel in that medium into a relatively cold liquid medium which acts as a setting medium. Such a liquid medium may consist wholly of non-solvent for the cellulose derivative or it may contain a proportion of a solvent or softening agent therefore. The travel in the gaseous or vaporous medium may be omitted, the materials being extruded directly into a liquid setting medium.

Alternatively, the cellulose derivative may be set simply by the action of a gaseous or vaporous atmosphere, e. g. air or steam, which is preferably circulated under conditions which maintain its temperature substantially constant at a value which is advantageously considerably below the temperature of the materials before extrusion. Such an atmosphere may be maintained at super-normal, normal or sub-normal pressure.

The shaped materials may be subjected to a stretching operation after they have been set, whether or not they have been stretched in the setting medium. Before such a stretching operation they may be treated with a softening agent, e. g., a solution of a solvent or plasticiser or a solvent vapour and/or they may be softened by heating. Advantageously, the materials are stretched while immersed in or wetted with water or other non-solvent containing hydroxyl radicles whether in liquid or vapour form. They may be with advantage stretched while immersed in hot water or in a steam chamber. In this way the tenacity of the products may be still further increased.

Alternatively or in addition the materials may be subjected to the action of a shrinking agent, e. g., a solution of a solvent for the cellulose derivative, in the absence of stretching tension so as further to modify their properties.

The cellulose derivatives may be admixed before or after fusion with effect materials such as, for example, pigments and dyes, and/or with fire-retardants or other agents which may serve to modify the characteristics of the products. The distribution of such added agents should be as uniform as possible and may be effected, for example, by mixing a solution of the cellulose derivaive in a volatile solvent with the appropriate agent or agents and then evaporating the solvent.

The ironing point of products which have been produced according to the invention and which have a basis of a cellulose derivative which contains free hydroxyl groups may be substantially raised by esterifying the products, especially with polybasic acid esterifying agents, e. g., with halides of polycarboxylic acids, e. g., adipyl, phthalyl, oxalyl, succinyl or thionyl chloride, and/or with the corresponding anhydrides, for example as described in U. S. application, S. No. 306,704, filed November 29, 1939, or in S. No. 344,460, filed July 8, 1940. Further modification and improvement of the products may be secured by treatment according to the process described in U. S. application S. No. 335,376, filed September 4, 1940. The combination of forming shaped materials according to the process of the invention and subsequently esterifying them to increase their ironing point renders it possible to spin products from cellulose derivatives having melting points which are undesirably low for textile purposes but which are advantageous in that the spinning temperature, which is determined by the melting point may be lower.

Filamentary products produced according to the invention may be associated together, e. g., by twisting, to form yarns and they may then be employed in the manufacture of woven, knitted or other fibres. Filaments of relatively high denier may be employed directly as artificial horsehair or bristles.

For the production of fibres according to the invention filamentary products produced as described above may be cut after winding or while travelling, e. g., by the methods described in U. S. Patent No. 2,010,078; U. S. application S. No. 155,949, filed July 27, 1937; and British Patents Nos. 409,519, 394,702, 357,565, 317,025, and 317,026; such fibres are preferably produced from filamentary materials which have been crimped by twisting the yarn, setting the twist by steaming or similar treatment, and untwisting. Alternatively, or in addition, the cut fibres may be crinkled by treatment with a solution of an appropriate solvent or swelling agent as described, for example, in U. S. applications S. No. 352,632, filed August 14, 1940; 319,076, filed February 15, 1940; 333,936, filed May 10, 1940; 347,300, filed July 24, 1940; and British Patent No. 523,425. The fibres so produced may be spun into yarn.

Films, foils and the like produced according to the invention may be employed for any of the purposes to which cellulose acetate or similar thermoplastic films, foils and the like have been previously applied. For example, they may be employed for wrapping purposes, as bases for carrying photographic emulsions, as glass substitutes, and for the manufacture of splinterless glass.

The following examples illustrate the invention:

Example 1

One part of cellulose is pre-treated with an excess of 95% acetic acid containing 0.2% sulphuric acid for 24 hours at 20° C. After removing excess liquid the cellulose is heated for 8 hours at 40° C. with a mixture of 5 parts butyric anhydride and 4 parts butyric acid. The product is allowed to stand at 20° C. until dissolved in the butyrylating mixture and excess anhydride is then hydrolysed by adding water. The cellulose ester is precipitated and simultaneously stabilised by pouring the solution into dilute aqueous sodium carbonate solution, is washed with water, with dilute aqueous acetic acid and finally with water again, and then dried.

Cellulose butyrate produced by the above-described method, having a melting point of about 150° C., is fused and introduced into a stainless steel vessel fitted with a stirrer and carrying suitable spinning orifices mounted at the lower ends of narrow tubular elements projecting outwardly from the base of the vessel. Fine metal gauze is also mounted in the tubular elements to constitute a filtering means for the fused material before it reaches the orifices. The vessel, including the tubular elements, is wound with resistance wire so that the temperature of the contents may be maintained at the desired value, in this case 165° C. A pressure of 200 lbs. per square inch is applied to the surface of the fused mass by means of compressed air and the mass extruded through the orifices into a chamber containing wet steam at 125° C. through which the extruded materials pass in a time of 0.1 second. From this chamber the materials pass into a bath of water maintained at 30° C. The materials are continuously withdrawn from the bath and are wound up so as to draw them down during their travel from the orifices.

Example 2

Cellulose acetate containing 2.3 acetyl radicles per $C_6H_{10}O_5$ group is heated for 8 hours at 192° C. with an equal weight of butyric anhydride and the resulting solution is poured into excess xylene. The precipitated ester is washed thoroughly with xylene and then, after drying, converted into filaments by the method described in Example 1 with the difference that, since the ester melts at about 240° C., extrusion is carried out at 255° C. and the water-bath is maintained at 60° C.

Example 3

An acidylation medium is prepared by heating 4 parts of adipic acid with 10 parts of acetic anhydride, driving off free acetic acid, dissolving the residue in about 800 parts of kerosene, and incorporating 0.1 parts of stannic chloride in the resulting solution.

The products of Example 1 are heated in hank form at 105° C. in this acidylation medium, the volume ratio being 120:1, for 10 hours. They are then washed with petroleum ether, air-dried and washed with 1% sodium carbonate solution at 25° C. for about 20 minutes and then with water. After a further wash with cold 1% acetic acid for about 5 minutes, and with hot water, the materials are dried at about 110° C. and are found to have a substantially increased ironing point.

Having described my invention, what I desire to secure by Letters Patent is:

1. Process for the production of artificial filaments, threads and like materials having a basis of a cellulose ester, which comprises extruding in the fused condition and while substantially free from volatile solvent a mixed cellulose ester which contains for each $C_6H_{10}O_5$ group more than 1.5 radicles of a fatty acid containing 3–6 carbon atoms in the molecule and at most 0.7 acetyl radicles and a proportion of free nuclear hydroxyl radicles and which is substantially stable in the said condition, thereafter setting the extruded materials and subjecting them to an esterifying treatment whereby the ironing point of the materials is increased.

2. Process for the production of artificial filaments, threads and like materials having a basis of a cellulose ester, which comprises extruding in the fused condition and while substantially free from volatile solvent a mixed cellulose ester which contains for each $C_6H_{10}O_5$ group more than 1.5 radicles of a fatty acid containing 3–6 carbon atoms in the molecule and at most 0.7 acetyl radicles and a proportion of free nuclear hydroxyl radicles and which is substantially stable in the said condition, thereafter setting the extruded materials and subjecting them to an esterifying treatment with a polybasic acid esterifying agent whereby the ironing point of the materials is increased.

3. A composition suitable for the production of filaments, threads and like materials by the extrusion of the same in a fused condition and in the absence of volatile solvent into a setting medium, said composition comprising a mixed cellulose ester which contains for each $C_6H_{10}O_5$ group more than 1.5 radicles of a fatty acid containing 3–6 carbon atoms in the molecule and at most 0.7 acetyl radicles and a cellulose ester of a higher fatty acid and which is substantially stable in a fused condition.

4. A composition suitable for the production of filaments, threads and like materials by the extrusion of the same in a fused condition and in the absence of volatile solvent into a setting medium, said composition comprising a mixed cellulose ester which contains for each $C_6H_{10}O_5$ group more than 1.5 radicles of a fatty acid containing 3–6 carbon atoms in the molecule and at most 0.7 acetyl radicles and a cellulose ester of stearic acid which is substantially stable in a fused condition.

HENRY DREYFUS.